US011223084B2

(12) United States Patent
Yuasa et al.

(10) Patent No.: US 11,223,084 B2
(45) Date of Patent: Jan. 11, 2022

(54) ENERGY STORAGE APPARATUS

(71) Applicants: GS Yuasa International Ltd., Kyoto (JP); Honda Motor Co., Ltd., Tokyo (JP)

(72) Inventors: Eiji Yuasa, Kyoto (JP); Kentaro Shibuya, Wako (JP)

(73) Assignees: GS YUASA INTERNATIONAL LTD., Kyoto (JP); HONDA MOTOR CO., LTD., Tokyo (JP)

( * ) Notice: Subject to any disclaimer, the term of this patent is extended or adjusted under 35 U.S.C. 154(b) by 140 days.

(21) Appl. No.: 16/219,731

(22) Filed: Dec. 13, 2018

(65) Prior Publication Data

US 2019/0198831 A1   Jun. 27, 2019

(30) Foreign Application Priority Data

Dec. 27, 2017   (JP) .............................. JP2017-251296

(51) Int. Cl.

| H01M 50/20 | (2021.01) |
| H01M 50/502 | (2021.01) |
| H01M 10/6557 | (2014.01) |
| H01G 9/14 | (2006.01) |
| H01M 10/6561 | (2014.01) |

(52) U.S. Cl.
CPC ......... *H01M 50/20* (2021.01); *H01M 50/502* (2021.01); *H01G 9/14* (2013.01); *H01M 10/6557* (2015.04); *H01M 10/6561* (2015.04)

(58) Field of Classification Search
CPC .............. H01M 2/1077; H01M 2/206; H01M 10/6557; H01M 10/6561; H01M 2/1005; H01M 2/1016; H01M 2/202; H01G 9/14; H01G 11/76; H01G 11/82; H01G 11/10; Y02E 60/10
USPC .......................................................... 429/151
See application file for complete search history.

(56) References Cited

U.S. PATENT DOCUMENTS

| 2005/0285567 A1* | 12/2005 | Kim .................. H01M 10/6557 320/116 |
| 2013/0052516 A1 | 2/2013 | Kim |
| 2015/0249239 A1 | 9/2015 | Ueda et al. |
| 2015/0270589 A1* | 9/2015 | Ejiri .................. H01M 10/6557 429/72 |

(Continued)

FOREIGN PATENT DOCUMENTS

| JP | H 11-67176 A | 3/1999 |
| JP | 2006-012841 A | 1/2006 |

(Continued)

*Primary Examiner* — Christian Roldan
(74) *Attorney, Agent, or Firm* — McGinn I.P. Law Group, PLLC.

(57) ABSTRACT

In the present embodiment, an energy storage apparatus includes: a plurality of energy storage devices arranged in a first direction; a pair of end members disposed on both ends in the first direction of the plurality of energy storage devices; a connecting member that extends in the first direction and connects the pair of end members; and an intermediate member disposed between adjacent two of the energy storage devices, wherein the connecting member is decouplable at a position corresponding to the intermediate member in the first direction, and the intermediate member includes a first intermediate part and a second intermediate part that are separable in the first direction and are engaged with each other.

10 Claims, 11 Drawing Sheets

(56) References Cited

U.S. PATENT DOCUMENTS

| | | | |
|---|---|---|---|
| 2016/0190526 A1* | 6/2016 | Yamada | H01M 2/1083 |
| | | | 180/68.5 |
| 2017/0047562 A1 | 2/2017 | Ogawa et al. | |
| 2017/0244075 A1 | 8/2017 | Yuasa et al. | |
| 2017/0244091 A1* | 8/2017 | Yuasa | H01G 11/10 |
| 2018/0138473 A1 | 5/2018 | Bessho et al. | |

FOREIGN PATENT DOCUMENTS

| | | |
|---|---|---|
| JP | 2012-124071 A | 6/2012 |
| JP | 2013-045765 A | 3/2013 |
| JP | 2013-187046 A | 9/2013 |
| JP | 2014-075283 A | 4/2014 |
| JP | 2014-154504 A | 8/2014 |
| JP | 2016-122572 A | 7/2016 |
| JP | 2017-037789 A | 2/2017 |
| JP | 2017-147198 A | 8/2017 |
| WO | WO 2017/017913 A1 | 2/2017 |

\* cited by examiner

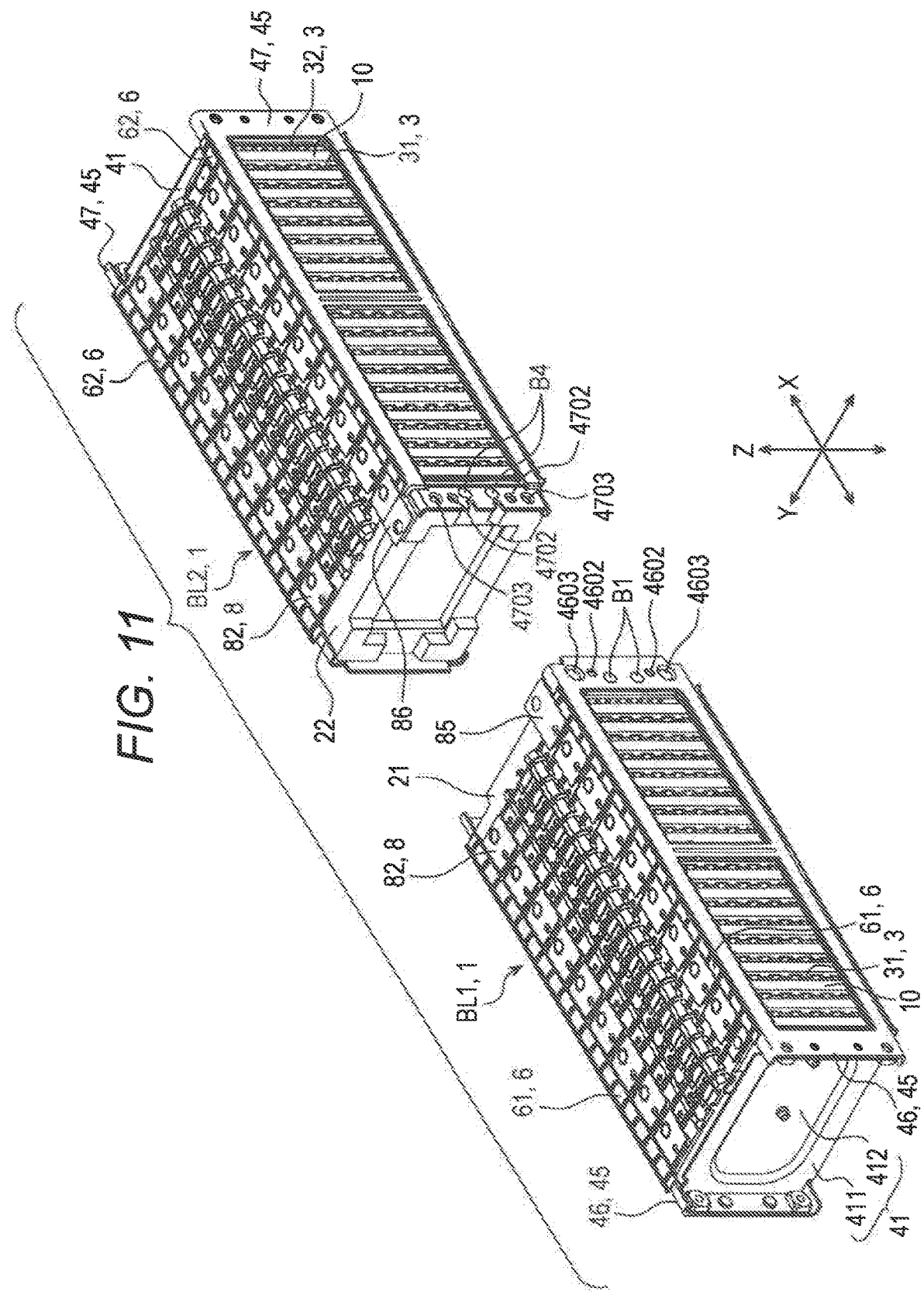

ENERGY STORAGE APPARATUS

CROSS-REFERENCE TO RELATED APPLICATIONS

This application claims the benefit of Japanese patent application No. 2017-261296 filed on Dec. 27, 2017 which is incorporated by reference.

FIELD

The present invention relates to an energy storage device including: a plurality of energy storage devices; a pair of end members disposed on both sides of the plurality of energy storage devices; and a connecting member which connects the pair of end members to each other.

BACKGROUND

Conventionally, there has been known a battery module which includes a plurality of battery cells (see JP 2017-37789 A). To be more specific, the battery module has: a plurality of battery cells; a plurality of bus bars; a frame formed of two frame bodies; and two leaf springs.

The battery cells are arranged in a row in the frame, and form a stacked product. The bus bars electrically connect the plurality of battery cells to each other. The frame fixes the plurality of battery cells by surrounding the battery cells as one unit. To be more specific, the frame has: a first frame disposed on an upper side; and a second frame disposed on a lower side. The stacked product is disposed inside the frame. That is, an upper surface side of the stacked product is confined by the first frame in a stacking direction, and a lower surface side of the stacked product is confined by the second frame in the stacking direction. The leaf spring is connected to the first frame and the second frame, and is disposed such that the leaf spring is sandwiched by an end surface of the stacked product and the frame. The leaf spring suppresses an expansion of the battery cells caused by the increase of an internal pressure in the battery cells from the outside of the battery cells.

In the battery module having the above-mentioned configuration, when a failure occurs in some (for example one) of the plurality of battery cells, the battery cell cannot be exchanged unless the whole battery module is disassembled by removing the bus bars, the frame formed of two frame bodies, the leaf springs and the like. Accordingly, an operation of exchanging the battery cell in which a failure occurs is extremely cumbersome. Particularly, when the bus bars are welded to the battery cells, it is necessary to remove the plurality of respective welded bus bars from the battery cells and hence, an operation of exchanging the battery cell in which a failure occurs becomes further cumbersome. Accordingly, in a battery module having a plurality of battery cells, when a failure occurs in some battery cells, there may be a case where it is necessary to exchange the whole battery module.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of an aspect of the present invention to provide an energy storage apparatus where some energy storage devices can be easily exchanged.

An energy storage apparatus according to an aspect of the present invention includes:

a plurality of energy storage devices arranged in a first direction;

a pair of end members disposed on both ends in the first direction of the energy storage devices;

a connecting member that extends in the first direction and connects the pair of end members; and an intermediate member disposed between adjacent two of the energy storage devices;

wherein the connecting member is decouplable at a position corresponding to the intermediate member in the first direction, and wherein the intermediate member includes a first intermediate part and a second intermediate part that are separable in the first direction and are engaged with each other.

With such a configuration, the energy storage apparatus can be divided into a first intermediate part side and a second intermediate part side at the position of the intermediate member and hence, some energy storage devices can be easily exchanged among the plurality of energy storage devices.

In the energy storage apparatus, the first intermediate part is fixed to a first connecting part of the connecting member, the first connecting part being decouplable toward one side in the first direction from a position corresponding to the intermediate member, and the second intermediate part is fixed to a second connecting part of the connecting member, the second connecting part being decouplable toward an other side in the first direction from the position corresponding to the intermediate member.

With such a configuration, the first connecting part and the second connecting part are fixed to the first intermediate part and the second connecting part and hence, even when the energy storage apparatus is divided, the energy storage devices disposed on a first intermediate part side of a dividing position are held by the end member, the first connecting part, and the first intermediate part, and the energy storage devices disposed on a second intermediate part side of the dividing position are held by the end member, the second connecting part, and the second intermediate part. Accordingly, the divided respective energy storage apparatuses can be easily handled.

The energy storage apparatus may include a fixing member that fixes the connecting member to the intermediate member, wherein the first and second connecting parts may overlap at the position corresponding to the intermediate member, and wherein the fixing member may fix the first connecting part and the second connecting part to the intermediate member at a position where the first and second connecting parts overlap.

In this manner, by fixing the first connecting part and the second connecting part to the intermediate member at the connecting position between the first connecting part and the second connecting part in a state where the first connecting part and the second connecting part overlap with each other, it is possible to suppress lowering of a strength of the energy storage apparatus which may be caused by adopting the decouplable connecting member.

As has been described heretofore, according to an aspect of the present invention, it is possible to provide an energy storage apparatus where some energy storage devices can be easily exchanged.

BRIEF DESCRIPTION OF DRAWINGS

The foregoing and other features of the present invention will become apparent from the following description and drawings of an illustrative embodiment of the invention in which:

FIG. 11 is a perspective view showing a state where the energy storage apparatus is divided.

DESCRIPTION OF EMBODIMENTS

Hereinafter, one embodiment of the present invention is described with reference to FIG. 1 to FIG. 11. Names of respective constitutional members (respective constitutional elements) of the present embodiment are used only for the present embodiment, and may differ from names of respective constitutional members (respective constitutional elements) used in BACKGROUND.

Figure 1:
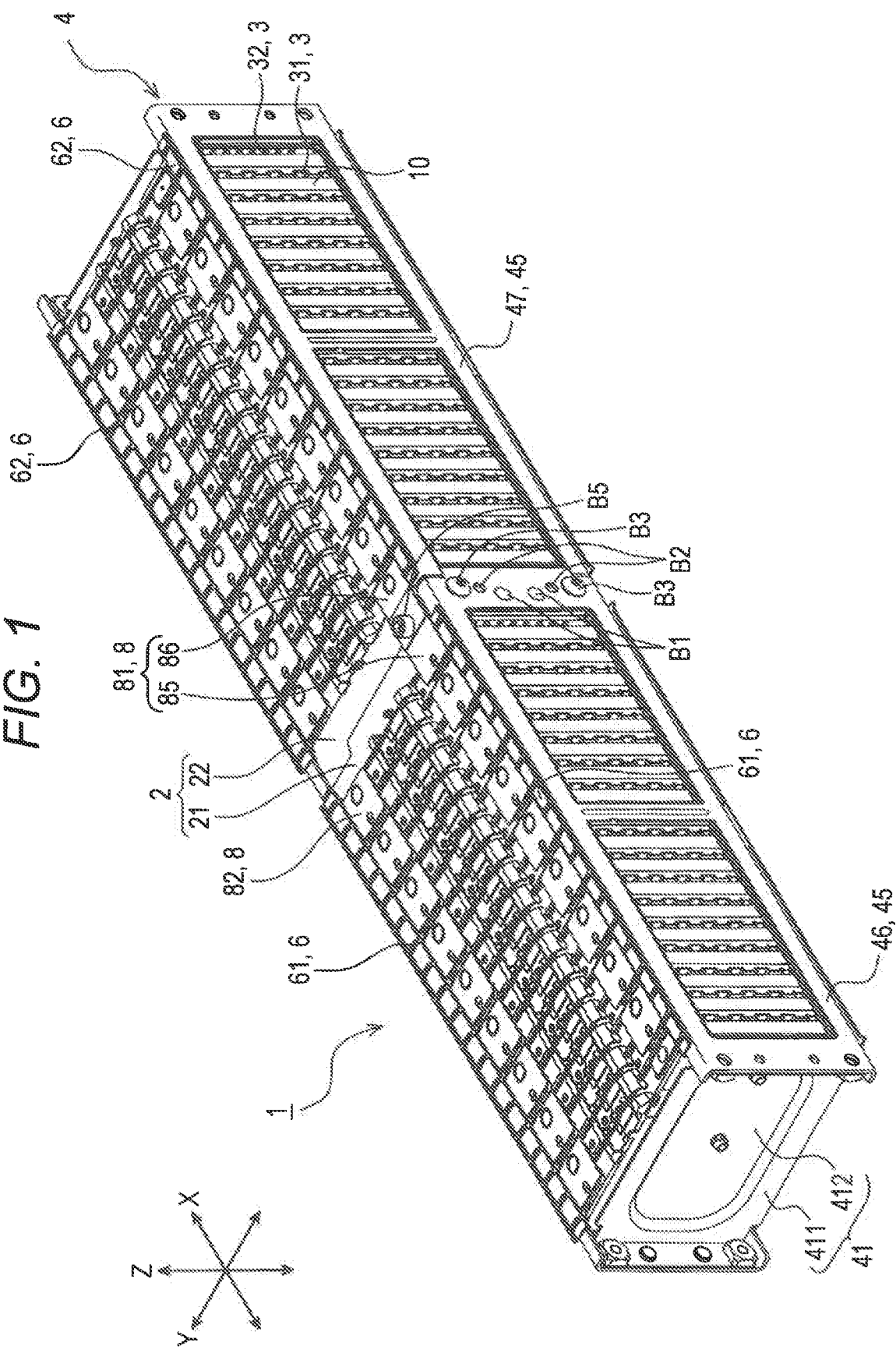
FIG. 1 is a perspective view of an energy storage apparatus according to an embodiment of the present invention.
Figure 2:
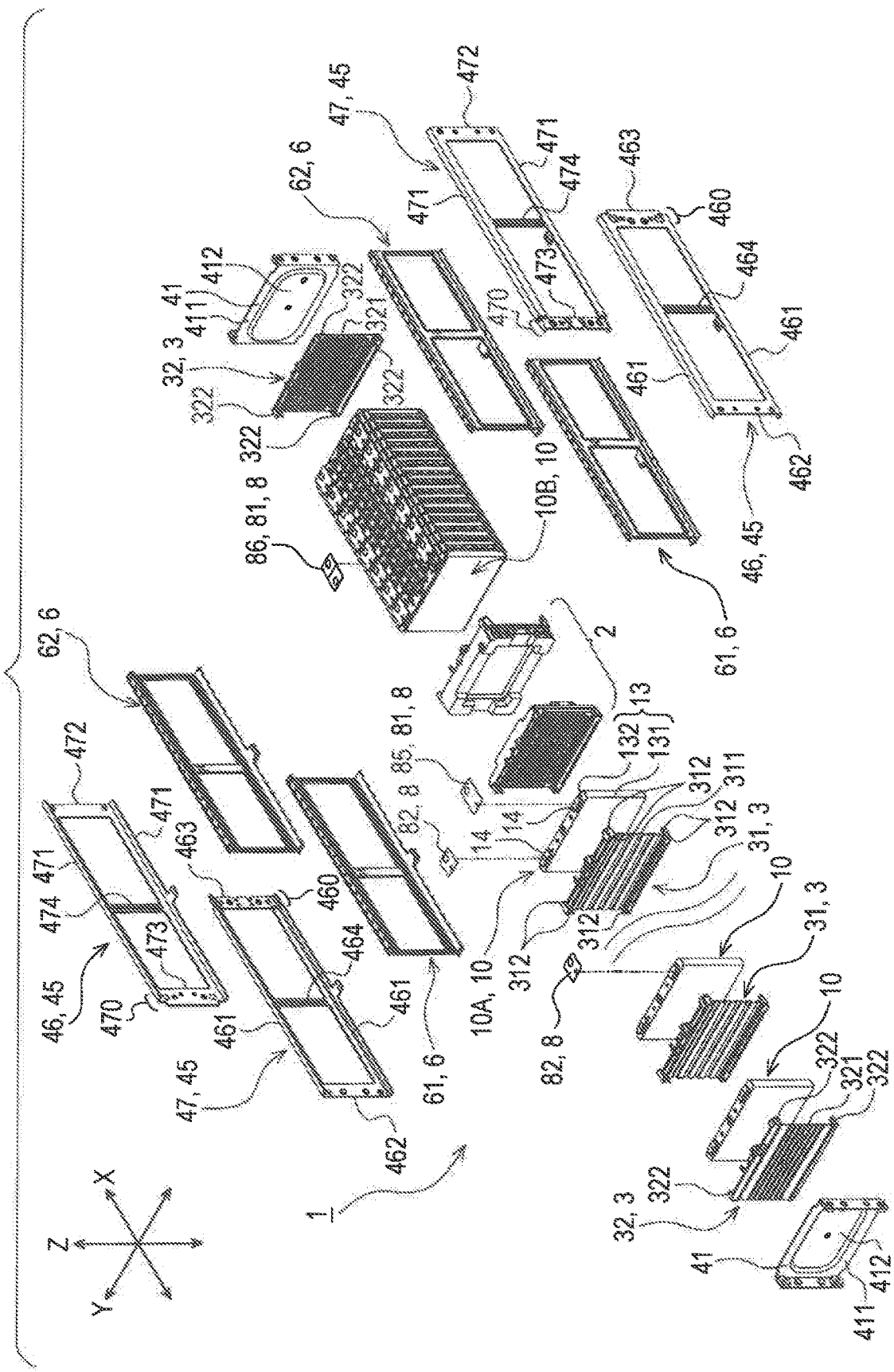
FIG. 2 is an exploded perspective view of the energy storage apparatus with a part omitted.

As shown in FIG. 1 and FIG. 2, the energy storage apparatus includes: a plurality of energy storage devices 10; an intermediate member 2 which is disposed between the energy storage devices 10 disposed adjacently to each other; and a holder 4 which holds the plurality of energy storage devices 10 and the intermediate member 2. The energy storage apparatus 1 includes fixing members B1, B2, B3, B4 which fix the holder 4 to the intermediate member 2. Further, the energy storage apparatus 1 includes: neighboring members 3 each of which is disposed adjacently to the energy storage device 10; insulators 6 which are disposed between the plurality of energy storage devices 10 and the holder 4; and bus bars 8 each of which connects the different energy storage devices 10 to each other in a conductive manner. The energy storage apparatus 1 of the present embodiment also includes a fixing member B5 for fixing the bus bar 8 to the intermediate member 2.

The plurality of energy storage devices 10 are arranged in a predetermined direction (first direction). Each of the plurality of energy storage devices 10 is a primary battery, a secondary battery, a capacitor or the like. The energy storage device 10 of the present embodiment is a nonaqueous electrolyte secondary battery which can charge electricity and discharge electricity. To be more specific, the energy storage device 10 is a lithium ion secondary battery which makes use of the movement of electrons generated along with the movement of lithium ions.

The energy storage device 10 includes: an electrode assembly; a case 13 which accommodates the electrode assembly together with an electrolyte solution therein; external terminals 14 each having at least a portion thereof exposed to the outside of the case 13; and current collectors which connect the electrode assembly and the external terminals 14 to each other in the inside of the case 13.

In the electrode assembly, positive electrodes and negative electrodes are alternately stacked to each other in a state where a separator is interposed between the positive electrode and the negative electrode. In such an electrode assembly, lithium ions move between the positive electrode and the negative electrode and hence, the energy storage device 10 can charge or discharge electricity.

The case 13 has: a case body 131 having an opening; and a plate-like lid plate 132 which seals (closes) the opening of the case body 131. The case body 131 of the present embodiment has a bottomed rectangular cylindrical shape. The case 13 having the case body 131 has a flat rectangular parallelepiped shape, and the plurality of energy storage devices 10 are arranged in a state where wide surfaces (wall portions) of the case 13 (case body 131) opposedly face each other.

Hereinafter, the direction along which the plurality of energy storage devices 10 are arranged is assumed as the X axis in orthogonal coordinates, the direction along which a pair of narrow-width surfaces (wall portions) of the case body 131 opposedly faces each other is assumed as the Y axis in the orthogonal coordinates, and the normal line direction of the lid plate 132 is assumed as the Z axis in the orthogonal coordinates.

The intermediate member 2 has an insulation property. The intermediate member 2 has a first intermediate part 21 and a second intermediate part 22 which are separable from each other and are engaged with each other in the X axis direction. In the present embodiment, the first intermediate part 21 and the second intermediate part 22 of the intermediate member 2 are engaged with each other by concavo-convex fitting engagement.

Figure 3:
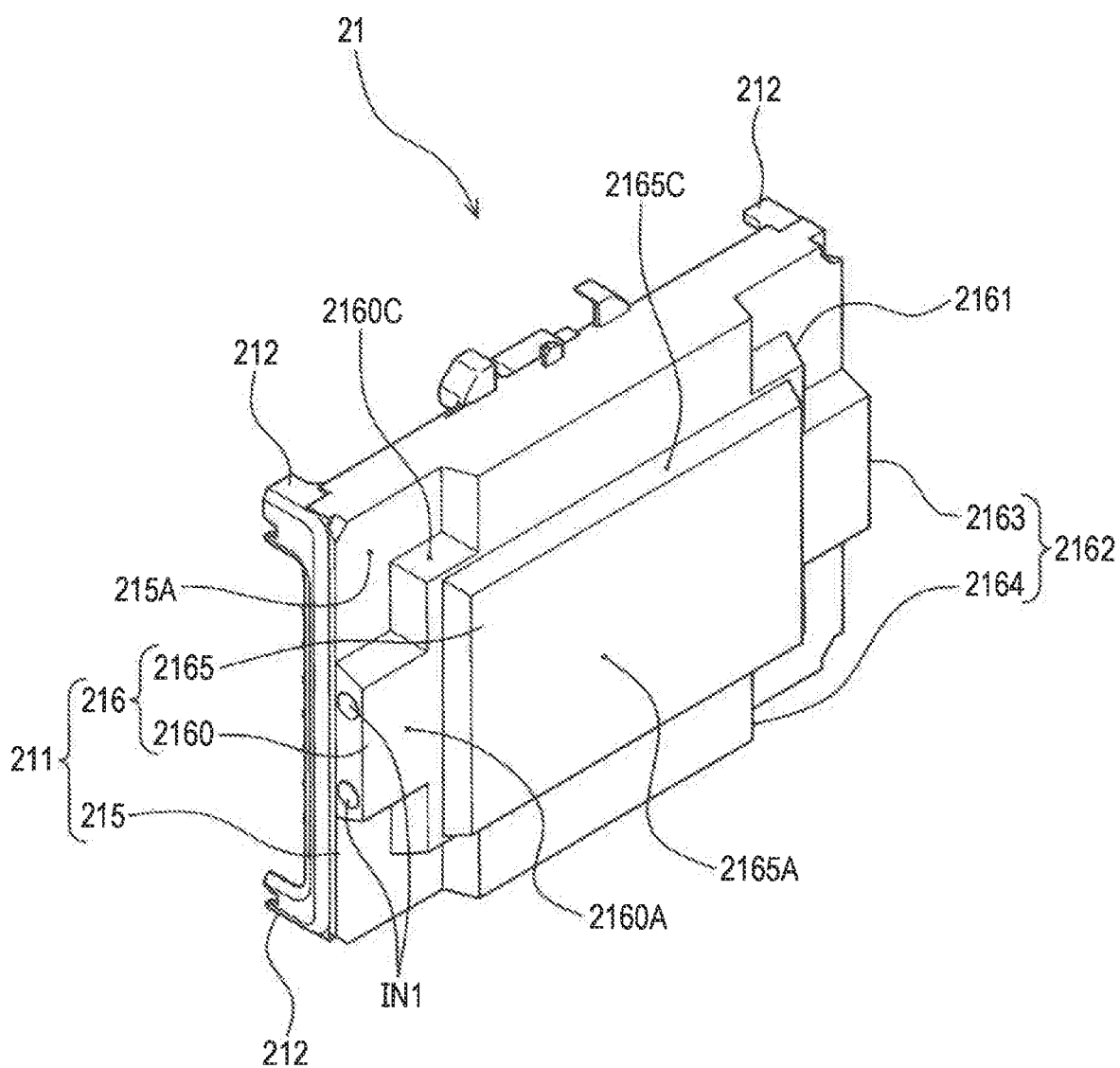
FIG. 3 is a perspective view of a first intermediate part of an intermediate member.
Figure 3:
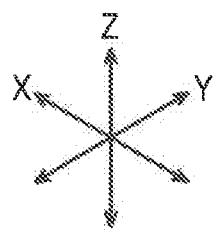
Figure 4:
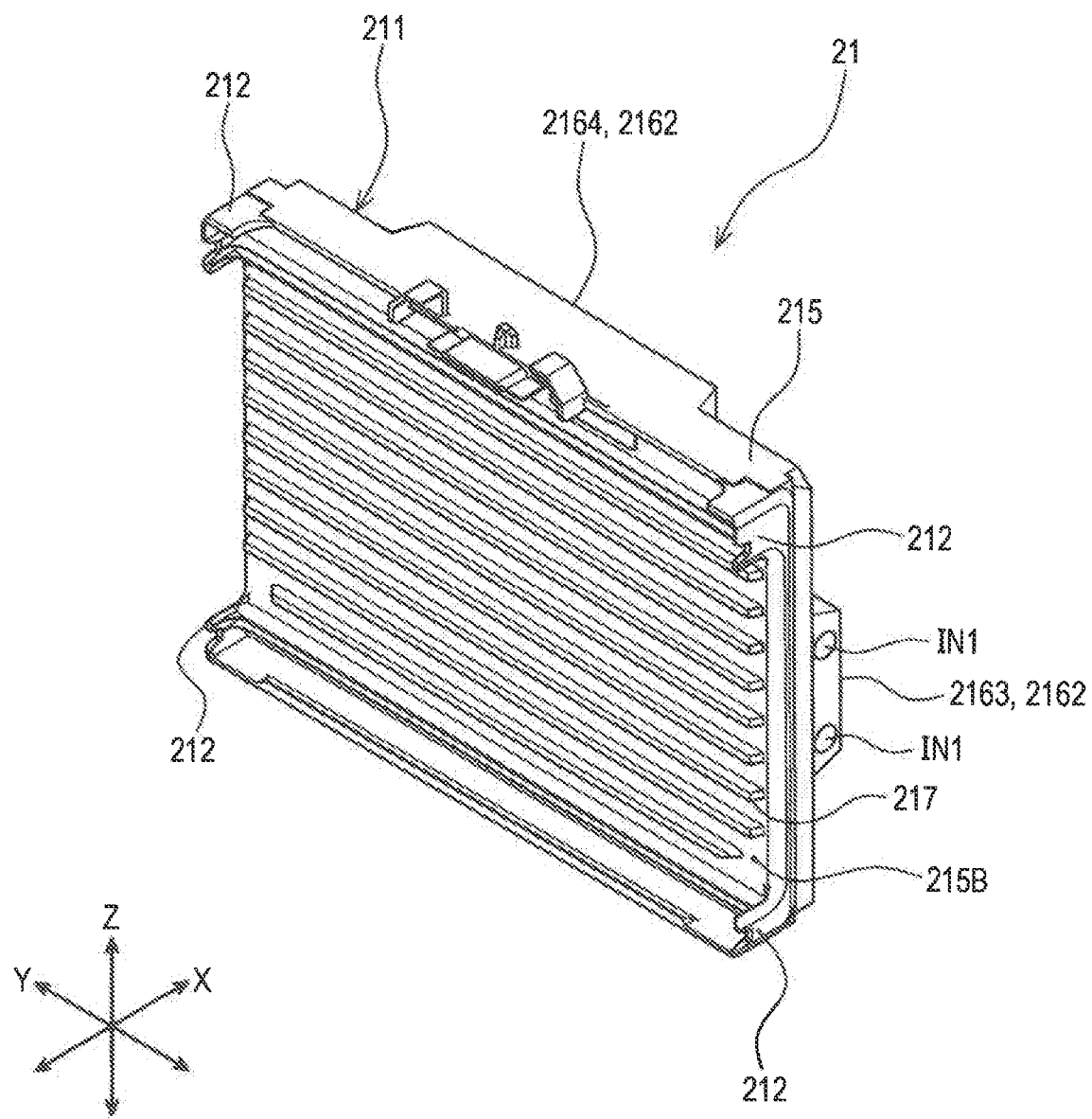
FIG. 4 is a perspective view of the first intermediate part.
Figure 5:
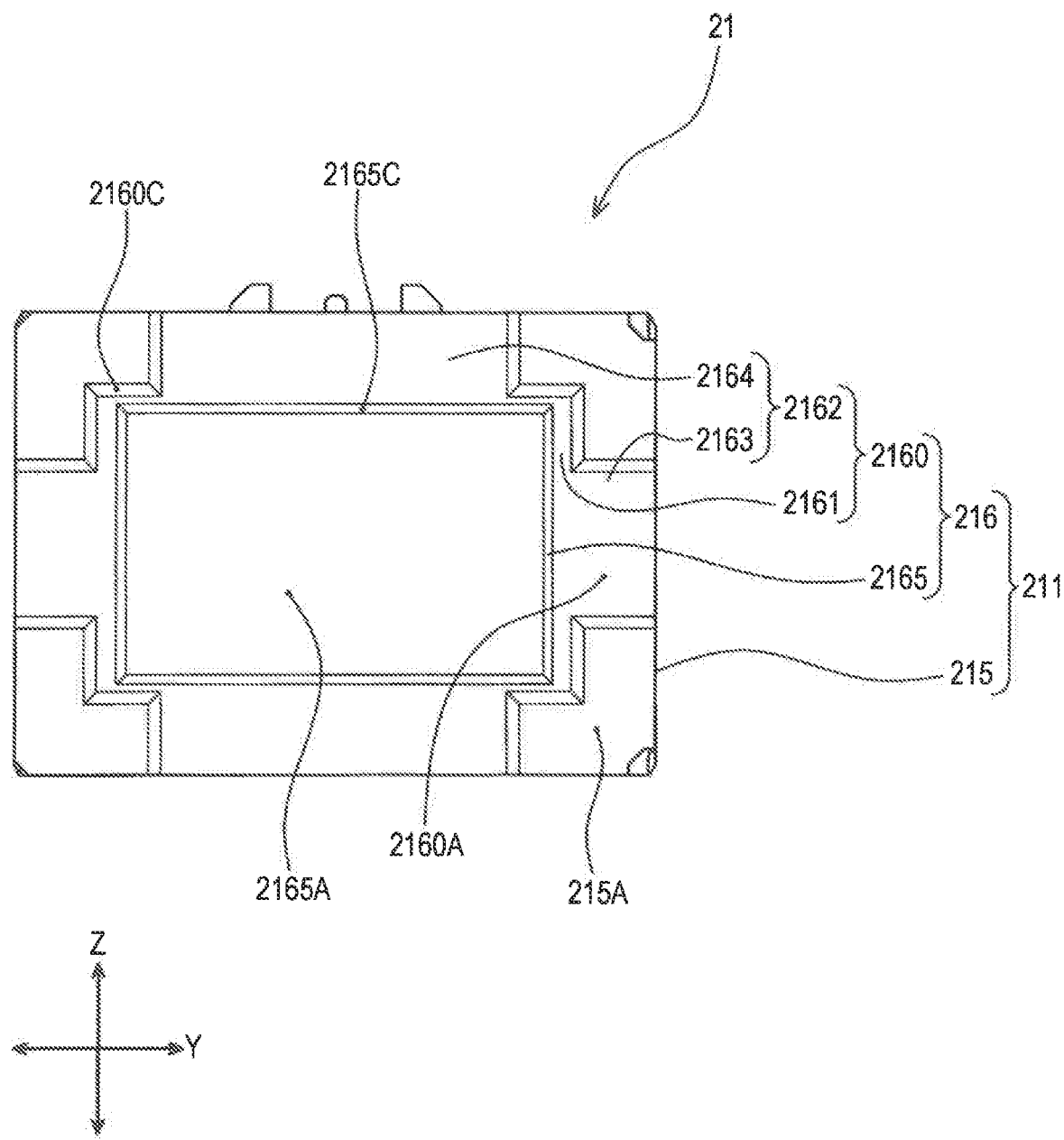
FIG. 5 is a view of the first intermediate part as viewed in an X axis direction.

As shown in FIG. 3 to FIG. 5, the first intermediate part 21 includes: a first body portion 211 which expands in a Y-Z plane (plane including the Y axis and the Z axis) direction; and first restricting portions 212 which restrict the movement of the energy storage device 10 disposed adjacently to the first body portion 211 relative to the first body portion 211.

The first body portion 211 has: a plate-like first base portion 215 which expands in the Y-Z plane direction; and a convex part 216 which protrudes toward the other side in the X axis direction from a surface 215A of the first base portion 215 on the other side in the X axis direction. The first body portion 211 has a plurality of convex parts 217 which protrude from a surface 215B on one side in the X axis direction, and the plurality of convex parts 217 are brought into contact with the energy storage device 10 disposed adjacently to the first body portion 211 thus forming flow passages which allow a fluid (air in an example of the present embodiment) for regulating a temperature to pass therethrough between the first body portion 211 and the energy storage device 10.

The first base portion 215 has a rectangular plate shape corresponding to the energy storage device 10 (case 13). The first base portion 215 of the present embodiment has a rectangular shape elongated in the Y axis direction as viewed in the X axis direction (see FIG. 5).

The convex part 216 has at least one contact surface 2160C and at least one contact surface 2165C which expand in the direction perpendicular to the Y-Z plane and are brought into contact with the second intermediate part 22. To be more specific, the convex part 216 has a first convex part 2160 which protrudes from the other-side surface 215A of the first base portion 215; and a second convex part 2165 which protrudes from a distal end surface (an end surface in a protruding direction) 2160A of the first convex part 2160.

The first convex part 2160 has: a rectangular convex part 2161 which is disposed at a center portion of the other-side surface 215A of the first base portion 215; and extending convex parts 2162 which extend along the Y-Z plane direction from the rectangular convex part 2161. The distal end surface 2160A of the first convex part 2160 is a surface parallel to the other-side surface 215A of the first base portion 215. That is, a projecting amount of the rectangular convex part 2161 from the first base portion 215 (the other-side surface 215A) and a projecting amount of the extending convex part 2162 from the first base portion 215 (the other-side surface 215A) are equal. In the first convex part 2160, the surface 2160C which connects the other-side surface (the other-side surface of the first base portion 215) 215A and the distal end surface 2160A to each other is a contact surface which is brought into contact with the second intermediate part 22. In the present embodiment, the first convex part 2160 is formed such that cross-sectional shapes of the first convex part 2160 at respective positions in the X axis direction (cross sections along the Y-Z plane) are similar to each other, and the first convex part 2160 is formed into a tapered shape such that the cross-sectional shapes are gradually decreased in size in a direction toward a distal end side (the other side in the X axis direction).

The rectangular convex part 2161 is a rectangular convex part corresponding to the first base portion 215. In the present embodiment, the rectangular convex part 2161 has a rectangular shape elongated in the Y axis direction as viewed from the X axis direction (see FIG. 5).

In the present embodiment, the extending convex part 2162 includes: first extending convex parts 2163 which extend from the rectangular convex part 2161 in the Y axis direction to an end edge position of the first base portion 215 in the Y axis direction; and second extending convex parts 2164 which extend from the rectangular convex part 2161 in the Z axis direction to an end edge position of the first base portion 215 in the Z axis direction. A size of the first extending convex part 2163 in the Z axis direction is smaller than a size of the rectangular convex part 2161 in the Z axis direction. Further, a size of the second extending convex part 2164 in the Y axis direction is smaller than a size of the rectangular convex part 2161 in the Y axis direction. In the present embodiment, the first extending convex parts 2163 extend from both ends of the rectangular convex part 2161 in the Y axis direction respectively. That is, the first intermediate part 21 has two first extending convex parts 2163. Further, the second extending convex parts 2164 extend from both ends of the rectangular convex part 2161 in the Z axis direction respectively. That is, the first intermediate part 21 has two second extending convex parts 2164.

The second convex part 2165 has, similarly to the first convex part 2160, at least one contact surface 2165C which expands in a direction perpendicular to the Y-Z plane and is brought into contact with the second intermediate part 22. The second convex part 2165 is disposed at a center portion of the distal end surface 2160A of the first convex part 2160 (in a region corresponding to the rectangular convex part 2161 of the distal end surface 2160A). The distal end surface 2165A of the second convex part 2165 is a surface parallel to the other-side surface 215A of the first base portion 215 and the distal end surface 2160A of the first convex part 2160. In the second convex part 2165, the surface 2165C which connects the distal end surface 2160A of the first convex part 2160 and the distal end surface 2165A of the second convex part 2165 to each other is a contact surface which is brought into contact with the second intermediate part 22. The second convex part 2165 is a rectangular convex part which corresponds to the rectangular convex part 2161 and is smaller than the rectangular convex part 2161. In the present embodiment, the second convex part 2165 has a rectangular shape elongated in the Y axis direction as viewed in the X axis direction (see FIG. 5). The second convex part 2165 is formed such that cross-sectional shapes of the second convex part 2165 at respective positions in the X axis direction (cross-sectional shapes along the Y-Z plane) are similar to each other, and the second convex part 2165 is formed into a tapered shape such that the cross-sectional shapes are gradually decreased in size in a direction toward a distal end side (the other side in the X axis direction).

The first restricting portions 212 extend from the first body portion 211 in the X axis direction, and are brought into contact with the energy storage device 10 (to be more specific, the case 13) disposed adjacently to the first body portion 211 from the outside in the Y-Z plane direction thus restricting the movement of the energy storage device 10 in the Y-Z plane direction relative to the first body portion 211. In the present embodiment, the first restricting portions 212 extend from the first body portion 211 toward one side in the X axis direction.

The first intermediate part 21 has members to be fixed IN1 with which fixing members such as bolts engage on both ends of the first intermediate part 21 in the Y axis direction. In the present embodiment, the members to be fixed IN1 are insert nuts. The insert nuts IN1 are embedded in both ends of the first intermediate part 21 in the Y axis direction. To be more specific, the insert nuts IN1 are embedded in the end portions of the first extending convex part 2163 in the Y axis direction so as to make the fixing members engage with the insert nuts IN1 from end surface sides of the first extending convex parts 2163 in the Y axis direction. In the present embodiment, two insert nuts IN1 are disposed at respective end portions of the first intermediate part 21 in the Y axis direction in a spaced-apart manner in the Z axis direction.

Figure 6:
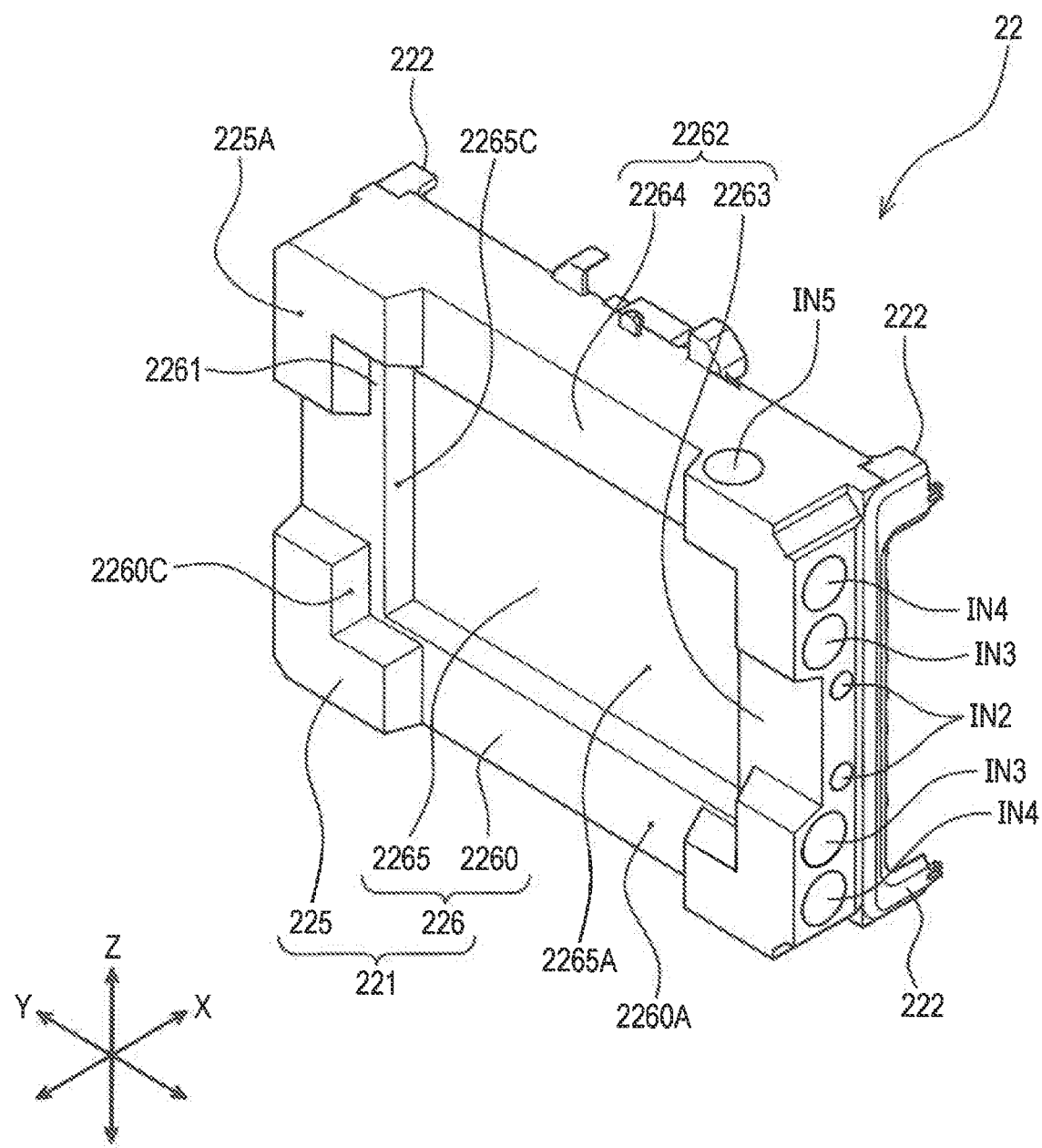
FIG. 6 is a perspective view of a second intermediate part of the intermediate member.
Figure 7:
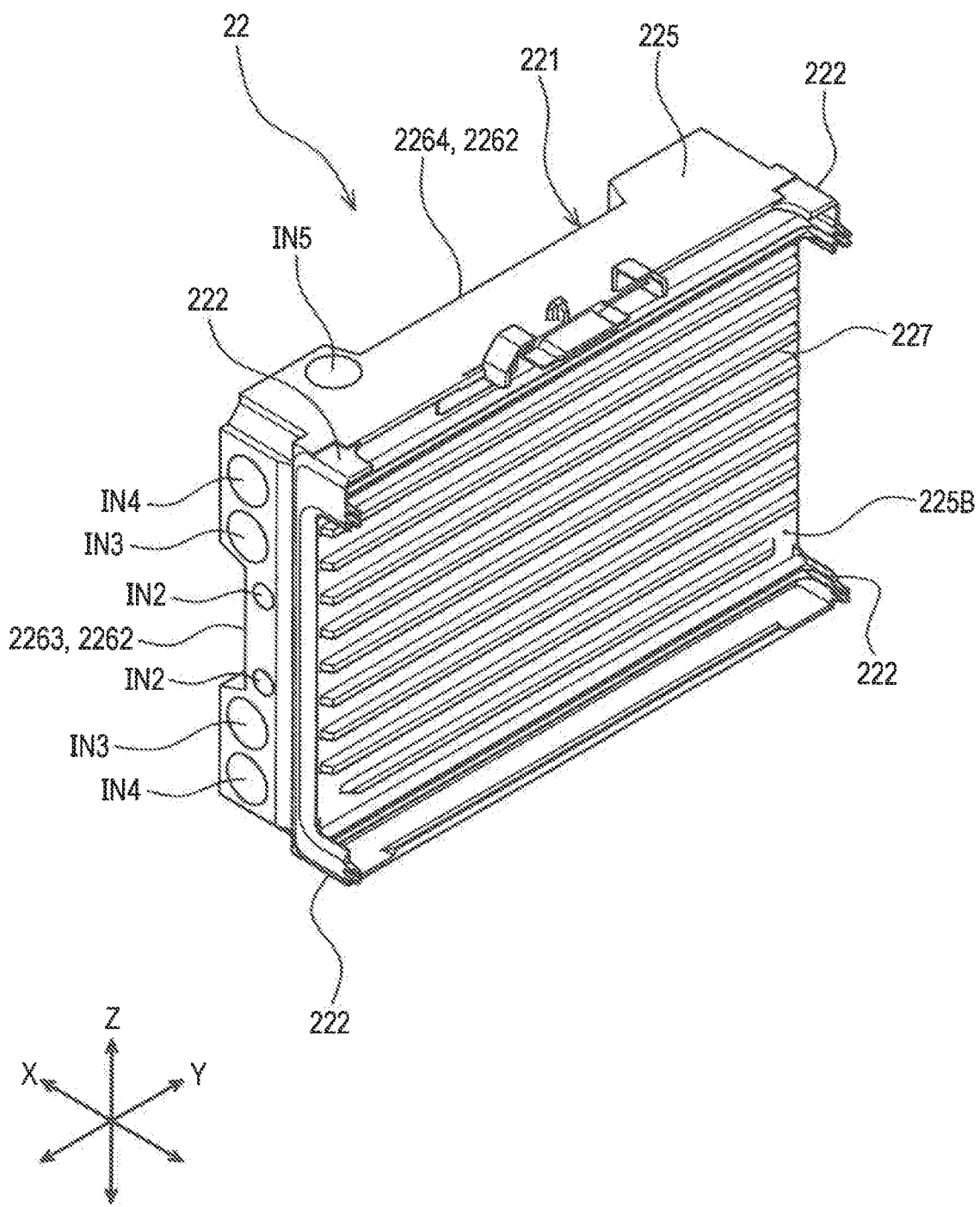
FIG. 7 is a perspective view of the second intermediate part.
Figure 8:
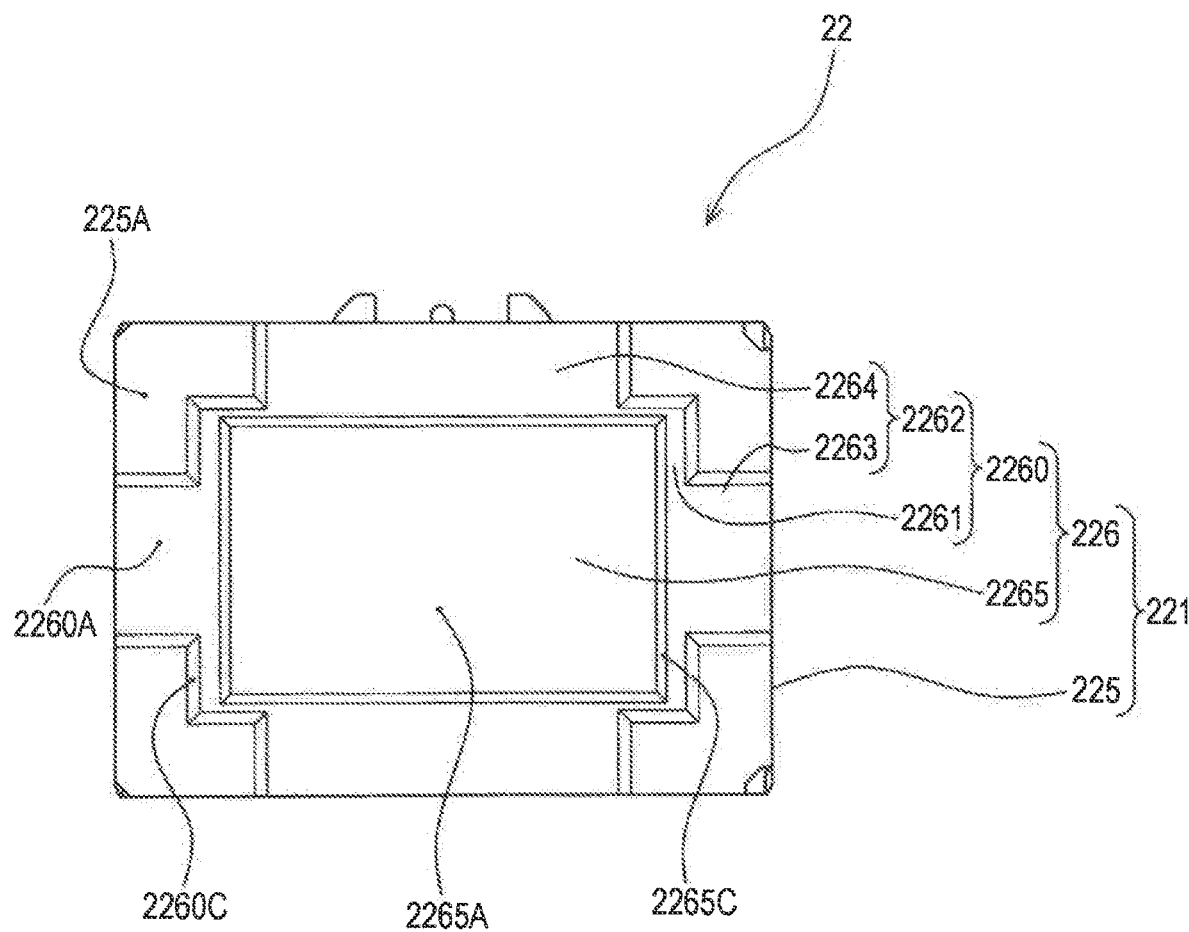
FIG. 8 is a view of the second intermediate part as viewed in the X axis direction.
Figure 8:
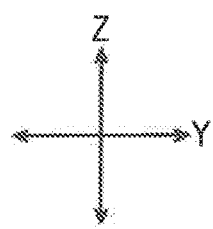

As shown in FIG. 6 to FIG. 8, the second intermediate part 22 has: a second body portion 221 which expands in the Y-Z plane direction; and second restricting portions 222 which restrict the movement of the energy storage device 10 disposed adjacently to the second body portion 221 relative to the second body portion 221.

The second body portion 221 has: a plate-like second base portion 225 which expands in the Y-Z plane direction; and a recessed portion 226 which is recessed from one-side surface 225A of the second base portion 225 in the X axis direction toward the other side in the X axis direction. The second body portion 221 has a plurality of convex parts 227 which protrude from the other-side surface 225B in the X axis direction, and the plurality of convex parts 227 are brought into contact with the energy storage device 10 disposed adjacently to the second body portion 221 thus forming flow passages which allow a fluid (air in an example of the present embodiment) for regulating a temperature to pass therethrough between the second body portion 221 and the energy storage device 10.

The second base portion 225 has a rectangular plate shape corresponding to the energy storage device 10 (case 13). In the present embodiment, the second base portion 225 has the same shape as the first base portion 215 as viewed in the X axis direction, that is, has a rectangular shape elongated in the Y axis direction (see FIG. 8).

The recessed portion 226 has: at least one contact surface 2260C; and at least one contact surface 2265C which expand in a direction perpendicular to the Y-Z plane and are brought into contact with the first intermediate part 21. The convex part 216 of the first intermediate part 21 is fitted in the recessed portion 226. That is, the recessed portion 226 of the second intermediate part 22 has a shape corresponding to the convex part 216 of the first intermediate part 21 (a shape allowing the engagement of the convex part 216 by concavo-convex fitting engagement), and the recessed portion 226 of the second intermediate part 22 and the convex part 216 of the first intermediate part 21 engage with each other. To be more specific, the recessed portion 226 has: a first recessed portion 2260 which is recessed from one-side surface 225A of the second base portion 225; and a second recessed portion 2265 which is recessed from a bottom surface (end surface in a recessing direction) 2260A of the first recessed portion 2260.

The first recessed portion 2260 has: a rectangular recessed portion 2261 which is disposed at a center portion of the one-side surface 225A of the second base portion 225; and an extending recessed portion 2262 which extends along the Y-Z plane direction from the rectangular recessed portion 2261. The bottom surface 2260A of the first recessed portion 2260 is a surface parallel to the one-side surface 225A of the second base portion 225. That is, an indenting amount of the rectangular recessed portion 2261 from the one-side surface 225A of the second base portion 225 and an indenting amount of the extending recessed portion 2262 from the one-side surface 225A of the second base portion 225 are equal. In the first recessed portion 2260, the surface 2260C which connects the one-side surface (one-side surface of the second base portion 225) 225A and the bottom surface 2260A to each other is a contact surface which is brought into contact with the first intermediate part 21 (to be more specific, the surface 2160C of the first convex part 2160). Further, in the present embodiment, the first recessed portion 2260 is formed such that wall surface shapes (wall surface shapes on the Y-Z plane) at respective positions in the X axis direction are similar to each other, and the wall surface shapes are gradually decreased in size in the direction toward the bottom surface 2260A side (the other side in the X axis direction).

The rectangular recessed portion 2261 is a rectangular recessed portion corresponding to the second base portion 225. In the present embodiment, the rectangular recessed portion 2261 has a rectangular shape elongated in the Y axis direction as viewed in the X axis direction (see FIG. 8). The rectangular recessed portion 2261 engages with the rectangular convex part 2161 of the first convex part 2160 of the first intermediate part 21.

In the present embodiment, the extending recessed portion 2262 includes: first extending recessed portions 2263 which extend in the Y axis direction from the rectangular recessed portion 2261 to an end edge portion of the second base portion 225 in the Y axis direction; and second extending recessed portions 2264 which extend in the Z axis direction from the rectangular recessed portion 2261 to an end edge portion of the second base portion 225 in the Z axis direction. A size of the first extending recessed portion 2263 in the Z axis direction is smaller than a size of the rectangular recessed portion 2261 in the Z axis direction. A size of the second extending recessed portion 2264 in the Y axis direction is smaller than a size of the rectangular recessed portion 2261 in the Y axis direction. In the present embodiment, the first extending recessed portions 2263 extend from both ends of the rectangular recessed portion 2261 in the Y axis direction respectively. That is, the second intermediate part 22 has two first extending recessed portions 2263. The second extending recessed portions 2264 extend from both ends of the rectangular recessed portion 2261 in the Z axis direction respectively. That is, the second intermediate part 22 has two second extending recessed portions 2264. The respective first extending recessed portions 2263 engage with the corresponding first extending convex parts 2163 of the first convex part 2160 of the first intermediate part 21, and the respective second extending recessed portions 2264 engage with the corresponding second extending convex parts 2164 of the first convex part 2160 of the first intermediate part 21 respectively.

The second recessed portion 2265 has, similarly to the first recessed portion 2260, at least one contact surface 2265C which expands in a direction perpendicular to the Y-Z plane and is brought into contact with the first intermediate part 21. The second recessed portion 2265 is disposed at a center portion of the bottom surface 2260A of the first recessed portion 2260 (in a region corresponding to the rectangular recessed portion 2261 of the bottom surface 2260A). The bottom surface 2265A of the second recessed portion 2265 is a surface parallel to the one-side surface 225A of the second base portion 225 and the bottom surface 2260A of the first recessed portion 2260. In the second recessed portion 2265, the surface 2265C which connects the bottom surface 2260A of the first recessed portion 2260 and the bottom surface 2265A of the second recessed portion 2265 to each other is a contact surface which is brought into contact with the first intermediate part 21. The second recessed portion 2266 is a rectangular recessed portion corresponding to the rectangular recessed portion 2261 and smaller than the rectangular recessed portion 2261 in size. In the present embodiment, the second recessed portion 2265 has a rectangular shape elongated in the Y axis direction as viewed in the X axis direction (see FIG. 8). The second recessed portion 2265 is formed such that wall surface shapes (wall surface shapes on the Y-Z plane) at respective positions in the X axis direction are similar to each other, and the wall surface shapes are gradually decreased in size in a direction toward the bottom surface 2265A side (the other side in the X axis direction). The second recessed portion 2265 engages with the second convex part 2165 of the first intermediate part 21.

The second restricting portions 222 extend from the second body portion 221 in the X axis direction, and are brought into contact with the energy storage device 10 (to be more specific, case 13) disposed adjacently to the second body portion 221 from the outside in the Y-Z plane direction thus restricting the movement of the energy storage device 10 in the Y-Z plane direction relative to the second body portion 221. In the present embodiment, the second restricting portions 222 extend from the second body portion 221 toward the other side in the X axis direction.

The second intermediate part 22 has members to be fixed IN2, IN3, IN4 with which fixing members such as bolts engage on both ends of the second intermediate part 22 in the Y axis direction. The second intermediate part 22 has a member to be fixed IN5 also on one end of the second intermediate part 22 in the Z axis direction. In the present embodiment, the members to be fixed IN2, IN3, IN4, IN5 are respectively formed of an insert nut. The insert nuts IN2, IN3, IN4 are embedded in both ends of the second intermediate part 22 in the Y axis direction, and the insert nut IN5 is embedded in one end of the second intermediate part 22 in the Z axis direction (an upper end in FIG. 6).

The insert nuts IN2 are embedded in the end portions of the second intermediate part 22 in the Y axis direction such that the bolts (fixing members) B4 (see FIG. 11) are engageable with the insert nuts IN2 from end surface sides of the second intermediate part 22 in the Y axis direction. In the present embodiment, in the second intermediate part 22, two insert nuts IN2 are disposed in a spaced-apart manner in the Z axis direction on respective end portions in the Y axis direction (to be more specific, at the position corresponding to the first extending recessed portion 2263 in the Z axis direction in the Z axis direction). Two insert nuts IN3 are disposed so as to sandwich the two insert nuts IN2 in the Z axis direction at respective end portions of the second intermediate part 22 in the Y axis direction. Two insert nuts IN4 are disposed so as to sandwich two insert nuts IN3 in the Z axis direction at respective end portions of the second intermediate part 22 in the Y axis direction. The insert nut IN5 is disposed on an end portion of the second intermediate part 22 in the Y axis direction on one end in the Z axis direction of the second intermediate part 22. To be more specific, the insert nut IN5 is disposed at the position where the insert nut IN5 and the bus bar 8 (first bus bar 81) disposed so as to stride over the intermediate member 2 overlap with each other as viewed in the Z axis direction.

Returning to FIG. 1 and FIG. 2, the neighboring member 3 is disposed between two energy storage devices 10 arranged in the X axis direction, or is disposed between the energy storage device 10 and a member which is disposed adjacently to the energy storage device 10 in the X axis direction (in an example of the present embodiment, a part of the holder 4). The neighboring member 3 includes plural kinds of neighboring members. In the present embodiment, the neighboring member 3 includes intermediate neighboring members 31 each of which is disposed adjacently to the energy storage devices 10 disposed at an intermediate position in the X axis direction, and terminal neighboring members 32 which are disposed adjacently to the energy storage devices 10 on outer sides of the energy storage devices 10 which are disposed outermost end in the X axis direction. Each intermediate neighboring member 31 is disposed between two energy storage devices 10 disposed adjacently to each other at positions where the intermediate member 2 is not disposed. That is, the energy storage apparatus 1 includes the plurality of intermediate neighboring members 31. The terminal neighboring members 32 are disposed on the outer sides of the energy storage devices 10 disposed on outermost ends in the X axis direction respectively. That is, the energy storage apparatus 1 includes the pair of terminal neighboring members 32.

Each of the plurality of intermediate neighboring members 31 has an insulation property, and is disposed between two energy storage devices 10 disposed adjacently to each other in the X axis direction. Each of the plurality of intermediate neighboring members 31 has: a plate-like third body portion 311 positioned between two energy storage devices 10 disposed adjacently to each other in the X axis direction; and third restricting portions 312 which restrict the movement of the energy storage devices 10 disposed adjacently to the third body portion 311 relative to the third body portion 311.

The third body portion 311 is a portion opposedly facing wide width surfaces of the cases 13 of the energy storage devices 10, and expands in the Y-Z plane. In the present embodiment, the third body portion 311 forms flow passages which allow a fluid (air in an example of the present embodiment) for regulating a temperature to pass therethrough between the third body portion 311 and the energy storage devices 10 disposed adjacently to the third body portion 311.

The third restricting portions 312 extend from the third body portion 311 in the X axis direction, and are brought into contact with the energy storage devices 10 (to be more specific, the cases 13) disposed adjacently to the third body portion 311 from the outside in the Y-Z plane direction thus restricting the movement of the energy storage devices 10 in the Y-Z plane direction relative to the third body portion 311. In the present embodiment, the third restricting portions 312 respectively extend from the third body portion 311 toward both sides in the X axis direction.

Each of the pair of terminal neighboring members 32 has an insulation property, and is disposed between the energy storage device 10 and the holder 4 (end member 41) disposed adjacently to each other in the X axis direction. Each of the pair of terminal neighboring members 32 has a fourth body portion 321 which is disposed adjacently to the energy storage device 10 between the energy storage device 10 and the holder 4, and fourth restricting portions 322 which restrict the movement of the energy storage device 10 relative to the fourth body portion 321.

The fourth body portion 321 is a portion opposedly facing the wide surface of the case 13 of the energy storage device 10 disposed on an end portion in the X axis direction, and expands in the Y-Z plane direction. In the present embodiment, the fourth body portion 321 forms flow passages which allow a fluid (air in an example of the present embodiment) for regulating a temperature to pass therethrough between the fourth body portion 321 and the energy storage device 10 disposed adjacently to the fourth body portion 321.

The fourth restricting portions 322 extend in the X axis direction from the fourth body portion 321, and are brought into contact with the energy storage device 10 (to be more specific, the case 13) disposed adjacently to the fourth body portion 321 from the outside in the Y-Z plane direction thus restricting the movement of the energy storage device 10 in the Y-Z plane direction relative to the fourth body portion 321. In the present embodiment, the fourth restricting portions 322 extend from the fourth body portion 321 toward a side where the energy storage device 10 is disposed.

The holder 4 collectively holds the plurality of energy storage devices 10, the intermediate member 2, and the plurality of neighboring members 3 by surrounding peripheries of the plurality of energy storage devices 10, the intermediate member 2, and the plurality of neighboring members 3. The holder 4 is formed of a member made of metal or the like and having conductivity. To be more specific, the holder 4 includes a pair of end members 41 disposed on both sides of a unit formed of the plurality of energy storage devices 10 in the X axis direction, and connecting members 45 which extend in the X axis direction and connect the pair of end members 41.

Each of the pair of end members 41 is disposed so as to sandwich the terminal neighboring member 32 between the energy storage device 10 disposed on an end in the X axis direction and the end member 41. The end member 41 expands in the Y-Z plane direction. To be more specific, the end member 41 has: a body 411 having a profile corresponding to the energy storage device 10 (in the present embodiment, a rectangular profile); and a pressure contact portion 412 which protrudes from the body 411 toward the terminal neighboring member 32 (fourth body portion 321) and is brought into contact with the terminal neighboring member 32 thus pressing the terminal neighboring member 32.

Figure 9:
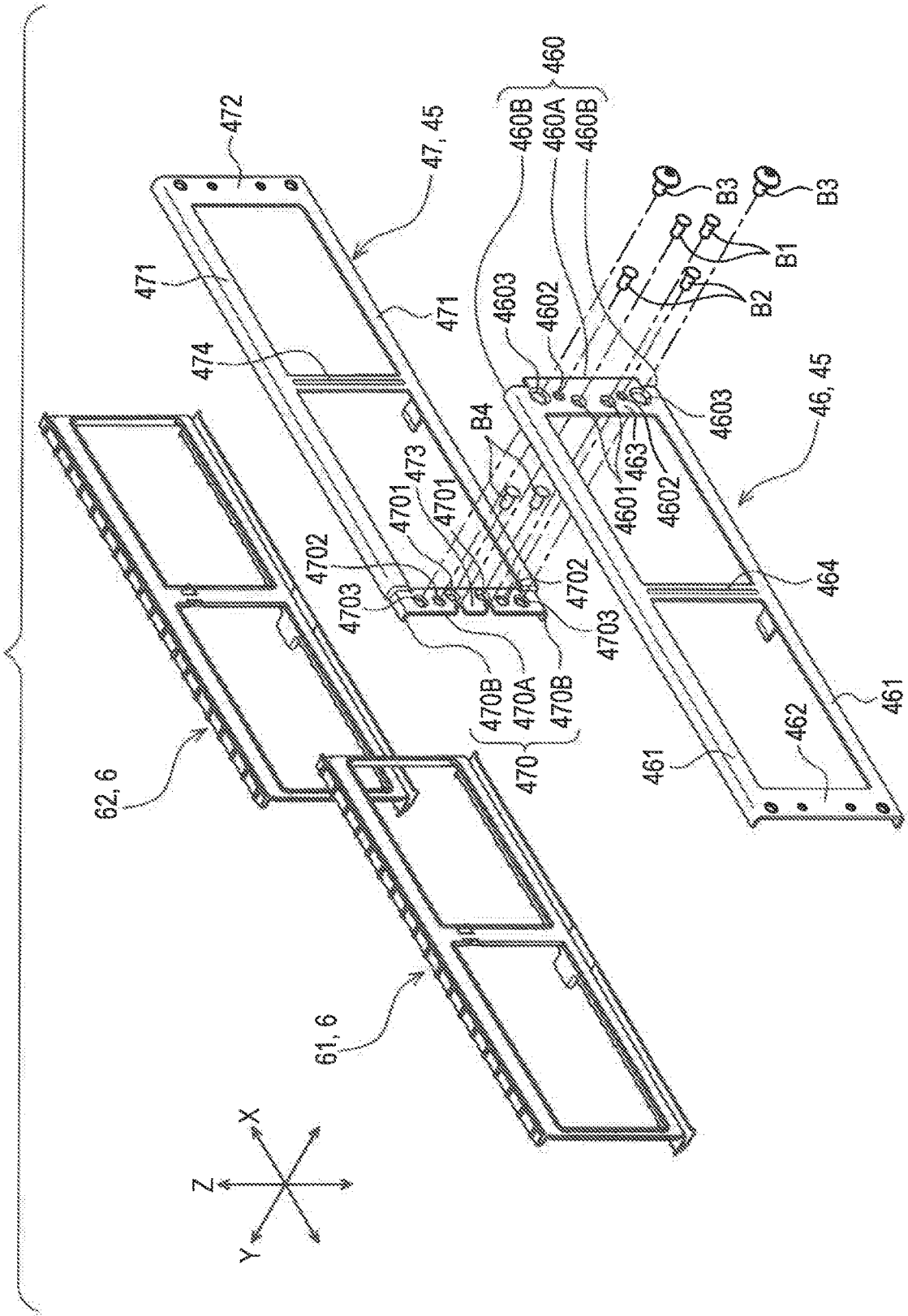
FIG. 9 is an exploded perspective view of a connecting member and an insulator.

As shown also in FIG. 9, the connecting member 45 is decouplable (dividable) into a plurality of portions (in an example of the present embodiment, two portions) in the X axis direction. In the present embodiment, the connecting member 45 is decouplable at the position corresponding to the intermediate member 2 in the X axis direction. In the connecting member 45, the portion decouplable toward one side in the X axis direction (toward a front side in FIG. 1) from the position corresponding to the intermediate member 2 is referred to as a first connecting part 46, and the portion decouplable toward the other side in the X axis direction (toward a rear side in FIG. 1) from the position corresponding to the intermediate member 2 is referred to as a second connecting part 47. In the present embodiment, the connecting member 45 is disposed on both sides of the energy storage devices 10 in the Y axis direction. That is, the holder 4 has the pair of connecting members 45.

The first connecting part 46 has: a pair of first beam portions 461 which extends in the X axis direction and is disposed in a spaced-apart manner in the Z axis direction; a first outer connecting portion 462 which connects end portions of the pair of first beam portions 461 on one side (on a side opposite to the second connecting part 47) to each other; a first inner connecting portion 463 which connects end portions of the pair of first beam portions 461 on the other side (on a second connecting part 47 side) to each other; and at least one first intermediate connecting portion 464 which connects the pair of first beam portions 461 to each other at an intermediate position in the X axis direction. With respect to the first connecting part 46, end portions of the respective first beam portions 461 on the other side and the first inner connecting portion 463 form a connecting portion (first connecting portion) 460 which is connected with the second connecting part 47.

The first connecting portion 460 is a portion overlapping with the second connecting part 47 (to be more specific, an end portion of the second connecting part 47 on one side in the X axis direction). To be more specific, the first connecting portion 460 has: a first portion 460A which expands in the Y-Z plane direction and is elongated in the Z axis direction; and a pair of second portions 460B which extends toward the inside in the Y axis direction (toward the intermediate member 2) from both ends of the first portion 460A in the Z axis direction.

The first portion 460A has a plurality of through holes 4601, 4602 and 4603. In the present embodiment, in the first portion 460A, three sets of through holes (a set of first through holes 4601, a set of second through holes 4602, and a set of third through holes 4603) are disposed. In such a configuration, two through holes disposed in a spaced-apart manner in the Z axis direction form one set.

The first through holes 4601 are disposed at positions corresponding to the insert nuts IN1 (members to be fixed) of the first intermediate part 21 (the positions at which the first through holes 4601 overlap with the insert nuts IN1 as viewed in the Y axis direction), and are used for fixing the first connecting part 46 to the first intermediate part 21. To be more specific, the first connecting part 46 is fixed to the first intermediate part 21 by making bolts (fixing members) B1 threadedly engage with the insert nuts IN1 of the first intermediate part 21 in a state where the bolts B1 pass through the first through holes 4601 (see FIG. 11).

The second through holes 4602 are disposed at positions corresponding to the insert nuts IN3 (members to be fixed) of the second intermediate part 22 (the positions at which the second through holes 4602 overlap with the insert nuts IN3 as viewed in the Y axis direction), and are used for connecting the first connecting part 46 and the second connecting part 47 to each other. To be more specific, the first connecting part 46 and the second connecting part 47 are connected to each other by making bolts (fixing members) B2 threadedly engage with threaded holes of the intermediate member 2 (in an example of the present embodiment, the insert nuts IN3 of the second intermediate part 22) in a state where the bolts B2 pass through the second through holes 4602 and fifth through holes 4702 of the second connecting part 47 (second connecting portion 470) which respectively overlap with the first connecting portion 460 respectively (see FIG. 1). In the energy storage apparatus 1 of the present embodiment, the connecting member 45 (the first connecting part 46 and the second connecting part 47) is fixed to the intermediate member 2 due to the threaded engagement of the bolts B2.

The third through holes 4603 are disposed at positions corresponding to the insert nuts (members to be fixed) IN4 of the second intermediate part 22 (at positions overlapping with the insert nuts IN4 as viewed in the Y axis direction), and are used for connecting the first connecting part 46 and the second connecting part 47 to each other. To be more specific, the first connecting part 46 and the second connecting part 47 are connected to each other by making bolts (fixing members) B3 threadedly engage with threaded holes (in an example of the present embodiment, the insert nuts IN4 of the second intermediate part 22) of the intermediate member 2 in a state where the bolts B3 pass through the third through holes 4603 and sixth through holes 4703 of the second connecting part 47 (second connecting portion 470) which respectively overlap with the first connecting portion 460 (see FIG. 1). In the energy storage apparatus 1 of the present embodiment, the connecting member 45 (the first connecting part 46 and the second connecting part 47) is fixed to the intermediate member 2 due to the threaded engagement of the bolts B3.

In the present embodiment, in the first connecting part 46, a set of the first through holes 4601 is disposed on an innermost side in the Z axis direction, a set of the second through holes 4602 is disposed outside the set of the first through holes 4601 in the Z axis direction so as to sandwich the set of the first through holes 4601, and a set of the third through holes 4603 is disposed outside the set of the second through holes 4602 in the Z axis direction so as to sandwich the set of the second through holes 4602.

The second connecting part 47 includes: a pair of second beam portions 471 which extends in the X axis direction and is disposed in a spaced-apart manner in the Z axis direction; a second outer connecting portion 472 which connects end portions of the pair of second beam portions 471 on the other side (on a side opposite to the first connecting part 46) to each other; a second inner connecting portion 473 which connects end portions of the pair of second beam portions 471 on one side (on a first connecting part 46 side) to each other; and at least one second intermediate connecting portion 474 which connects the pair of second beam portions 471 to each other at an intermediate position in the X axis direction. In the second connecting part 47, the end portions of the respective second beam portions 471 on one side and the second inner connecting portion 473 form the connecting portion (second connecting portion) 470 which is connected with the first connecting part 46.

The second connecting portion 470 is a portion which overlaps with the first connecting part 46 (to be more specific, an end portion on the other side in the X axis direction (first connecting portion 460)). To be more specific, the second connecting portion 470 has: a third portion 470A which expands in the Y-Z plane direction and is elongated in the Z axis direction; and a pair of fourth portions 470B which extends toward the inside (toward the intermediate member 2) side in the Y axis direction from both ends of the third portion 470A in the Z axis direction.

The third portion 470A has a plurality of through holes 4701, 4702, 4703. In the present embodiment, in the third portion 470A, three sets of through holes (a set of fourth through holes 4701, a set of fifth through holes 4702, a set of sixth through holes 4703) are disposed. Two through holes disposed in a spaced-apart manner in the Z axis direction forms one set.

The fourth through holes 4701 are disposed at positions corresponding to the insert nuts (members to be fixed) IN2 of the second intermediate part 22 (positions overlapping with the insert nuts IN2 as viewed in the Y axis direction), and are used for fixing the second connecting part 47 to the second intermediate part 22. To be more specific, the second connecting part 47 is fixed to the second intermediate part 22 by making bolts B4 threadedly engage with the insert nuts IN2 of the second intermediate part 22 in a state where the bolts B4 pass through the fourth through holes 4701 (see FIG. 11).

The fifth through holes 4702 are disposed at positions corresponding to the insert nuts IN3 of the second intermediate part 22 and the second through holes 4602 of the first connecting part 46 (positions overlapping with the insert nuts IN3 and the second through holes 4602 as viewed in the Y axis direction), and are used for connecting the first connecting part 46 and the second connecting part 47 to each other. To be more specific, the first connecting part 46 and the second connecting part 47 are connected to each other by making the bolts (fixing members) B2 threadedly engage with the threaded holes of the intermediate member 2 (in an example of the present embodiment, the insert nuts IN3 of the second intermediate part 22) in a state where the bolts B2 pass through the fifth through holes 4702 and the second through holes 4602 of the first connecting part 46 (first connecting portion 460) which overlap with the second connecting portion 470 (see FIG. 1). In the energy storage apparatus 1 of the present embodiment, the connecting member 45 (the first connecting part 46 and the second connecting part 47) is fixed to the intermediate member 2 due to the threaded engagement of the bolts B2.

The sixth through holes 4703 are disposed at positions corresponding to the insert nuts IN4 of the second intermediate part 22 and the third through holes 4603 of the first connecting part 46 (positions overlapping with the insert nuts IN4 and the third through holes 4603 as viewed in the Y axis direction), and are used for connecting the first connecting part 46 and the second connecting part 47 to each other. To be more specific, the first connecting part 46 and the second connecting part 47 are connected to each other by making the bolts (fixing members) B3 threadedly engage with the threaded holes of the intermediate member 2 (in an example of the present embodiment, the insert nuts IN4 of the second intermediate part 22) in a state where the bolts B3 pass through the sixth through holes 4703 and the third through holes 4603 of the first connecting part 46 (first connecting portion 460) which overlap with the second connecting portion 470 (see FIG. 1). In the energy storage apparatus 1 of the present embodiment, the connecting member 45 (the first connecting part 46 and the second connecting part 47) is fixed to the intermediate member 2 due to the threaded engagement of the bolts B3.

In the second connecting part 47 of the present embodiment, a set of the fourth through holes 4701 is disposed at an innermost side in the Z axis direction, a set of the fifth through holes 4702 is disposed outside the set of the fourth through holes 4701 in the Z axis direction so as to sandwich the set of the fourth through holes 4701, and a set of the sixth through holes 4703 is disposed outside the set of the fifth through holes 4702 in the Z axis direction so as to sandwich the set of the fifth through holes 4702. The fifth through holes 4702 are disposed at positions overlapping with the second through holes 4602 of the first connecting part 46 as viewed in the Y axis direction, and the sixth through holes 4703 are disposed at positions overlapping with the third through holes 4603 of the first connecting part 46 as viewed in the Y axis direction.

The insulator 6 has an insulation property, and is disposed between the connecting member 45 and the plurality of energy storage devices 10. The insulator 6 covers at least regions of the connecting member 45 which opposedly face the plurality of energy storage devices 10. With such configuration, the insulator 6 provides insulation between the connecting member 45 and the plurality of energy storage devices 10. In the present embodiment, the insulator 6 includes: a first insulator 61 which covers at least regions of the first connecting part 46 which opposedly face the plurality of energy storage devices 10; and a second insulator 62 which covers at least regions of the second connecting part 47 which opposedly face the plurality of energy storage devices 10.

The bus bar 8 is a member made of metal and having conductivity. The bus bar 8 makes the external terminals 14 of the energy storage devices 10 conductive to each other. A plurality of bus bars 8 (the number of bus bars 8 corresponding to the number of the plurality of energy storage devices 10) are provided to the energy storage apparatus 1. In the present embodiment, the plurality of bus bars 8 connect all of the plurality of energy storage devices 10 included in the energy storage apparatus 1 in series (making all energy storage devices 10 conductive to each other). The bus bars 8 include plural kinds of bus bars. In the present embodiment, the bus bars 8 include: a first bus bar 81 which makes the external terminals 14 of the energy storage devices 10 disposed adjacently to each other conductive to each other with the intermediate member 2 interposed therebetween (that is, connecting the external terminals 14 to each other in a state where the first bus bar 81 strides over the intermediate member 2); and second bus bars 82 each of which makes the external terminals 14 of the energy storage devices 10 disposed adjacently to each other conductive to each other with the intermediate neighboring member 31 interposed therebetween (that is, connecting the external terminals 14 in a state where the second bus bar 82 strides over the intermediate neighboring member 31). In the present embodiment, the energy storage apparatus 1 includes one first bus bar 81, and the plurality of second bus bars 82 (the number of the second bus bars 82 corresponding to the number of the plurality of energy storage devices 10).

Figure 10:
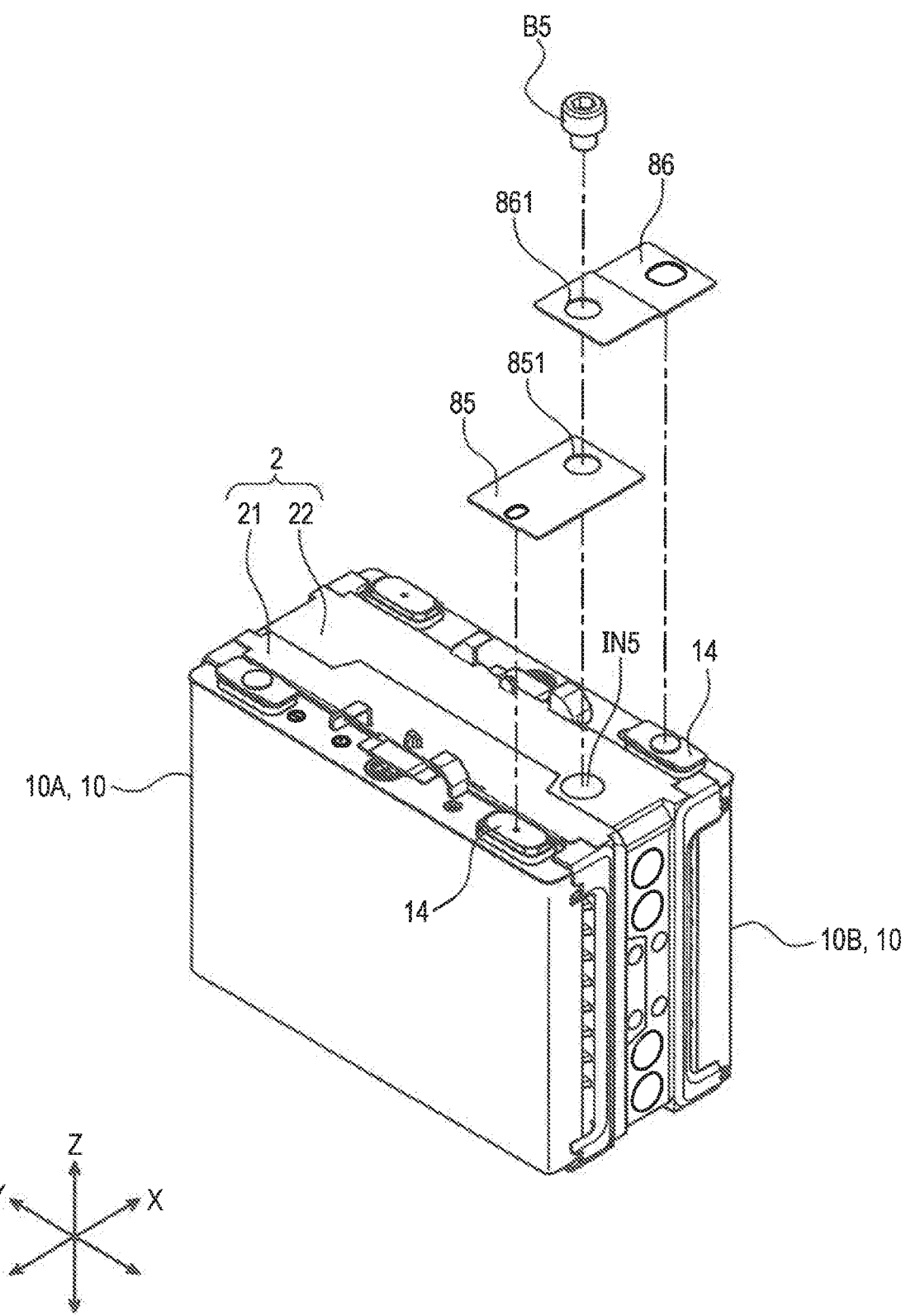
FIG. 10 is a view for describing the configuration of a first bus bar.

As also shown in FIG. 10, the first bus bar 81 has: a first member 85 which is connected to the external terminal 14 of the energy storage device 10 disposed adjacently to the intermediate member 2 on one side (first intermediate part 21 side) of the intermediate member 2 (hereinafter referred to as "one energy storage device 10A"); and a second member 86 which is connected to the external terminal 14 of the energy storage device 10 disposed adjacently to the intermediate member 2 on the other side (second intermediate part 22 side) of the intermediate member 2 (hereinafter referred to as "the other energy storage device 10B") and has a portion which overlaps with the first member 85.

The first member 85 has a plate shape extending from the external terminal 14 of the one energy storage device 10A to the intermediate member 2 along the X-Y plane (the plane including the X axis and the Y axis). A through hole 851 is formed in the first member 85 at a position overlapping with the insert nut IN5 of the second intermediate part 22.

The second member 86 has a plate shape extending from the external terminal 14 of the other energy storage device 10B to the intermediate member 2 along the X-Y plane. A portion of the second member 86 on an intermediate member 2 side overlaps with the first member 85. Further, the second member 86 has a through hole 861 at the position overlapping with the insert nut IN5 of the second intermediate part 22 and the through hole 851 of the first member 85.

The through hole 851 of the first member 85 and the through hole 861 of the second member 86 are used for connecting the first member 85 and the second member 86 to each other. To be more specific, the first member 85 and the second member 86 are connected to each other in a conductive manner by making the bolt (fixing member) B5 threadedly engage with a threaded hole of the intermediate member 2 (in an example of the present embodiment, the insert nut IN5 of the second intermediate part 22) in a state where the bolt B5 passes through the through hole 851 of the first member 85 and the through hole 861 of the second member 86 respectively. In the energy storage apparatus 1 of the present embodiment, the first bus bar 81 (first member 85 and second member 86) is fixed to the intermediate member 2 (second intermediate part 22) due to the threaded engagement of the bolt B5.

The plurality of respective second bus bars 82 have a plate shape extending in the X axis direction along the X-Y plane. With respect to two energy storage devices 10 disposed adjacently to each other in the X axis direction, the second bus bar 82 extends from the external terminal 14 of one energy storage device 10 to the external terminal 14 of the other energy storage device 10.

According to the above-mentioned energy storage apparatus 1, the energy storage apparatus 1 can be divided into a first intermediate part 21 side and a second intermediate part 22 side at the position of the intermediate member 2 and hence, some energy storage devices 10 can be easily exchanged among the plurality of energy storage devices 10. To be more specific, the energy storage apparatus 1 can be divided into a plurality of (in an example shown in FIG. 11, two) parts (hereinafter also referred to as "blocks") BL1, BL2 as shown in FIG. 11 by removing the bolts B2, B3 and B5. With such a configuration, when a failure occurs in some energy storage devices 10, it is possible to easily exchange the energy storage devices 10 where a failure occurs. That is, it is unnecessary to exchange the whole energy storage apparatus 1 (all of the plurality of energy storage devices 10).

In the above-mentioned configuration, the first intermediate part 21 is fixed to the first connecting part 46, and the second intermediate part 22 is fixed to the second connecting part 47. Accordingly, the plurality of energy storage devices 10 disposed on a first intermediate part 21 side of the dividing position are held by the end member 41, the first connecting part 46 and the first intermediate part 21, while the plurality of energy storage devices 10 disposed on a second intermediate part 22 side are held by the end member 41, the second connecting part 47 and the second intermediate part 22. Accordingly, handling of the respective blocks BL1, BL2 of the divided energy storage apparatus 1 is facilitated. That is, even when the energy storage apparatus 1 is divided at the position of the intermediate member 2, it is possible to handle the respective blocks BL1, BL2 without disassembling the plurality of energy storage devices 10.

Further, the first intermediate part 21 and the second intermediate part 22 engage with each other by concavo-convex fitting engagement and hence, the energy storage apparatus 1 can ensure a strength of the energy storage apparatus 1 when a force generated along the Y-Z plane direction is applied to a middle (intermediate) position of the energy storage apparatus 1 in the X axis direction. That is, both members 21, 22 engage with each other such that a portion of one member (first intermediate part 21) of the intermediate member 2 enters the other member (second intermediate part 22) and hence, bending of the energy storage apparatus 1 at the engagement position can be prevented.

In the energy storage apparatus 1 of the present embodiment, the first connecting part 46 and the second connecting part 47 overlap with each other at the position corresponding to the intermediate member 2, and the bolts B2, B3 fix the overlapping portions of the first connecting part 46 and the second connecting part 47 (the first connecting portion 460 and the second connecting portion 470) to the intermediate member 2. In this manner, the first connecting part 46 and the second connecting part 47 are fixed to the intermediate member 2 at the connecting position between the first connecting part 46 and the second connecting part 47 in a state where the first connecting part 46 (first connecting portion 460) and the second connecting part 47 (second connecting portion 470) overlap with each other. Accordingly, even when the connecting member 45 adopts the decouplable configuration, it is possible to suppress lowering of a strength of the energy storage apparatus 1.

It is needless to say that the energy storage apparatus of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

Although the energy storage apparatus 1 of the above-mentioned embodiment is dividable (decouplable) into two blocks BL1, BL2, the present invention is not limited to such a configuration. The energy storage apparatus 1 may be configured to be dividable (decouplable) into three or more blocks BL1, B12, BL3, . . . . In this case, it is preferable that the intermediate member 2 be disposed at respective dividing positions.

In the energy storage apparatus 1 of the above-mentioned embodiment, although the plurality of energy storage devices 10 are disposed (held) in the plurality of blocks BL1, BL2 respectively, the present invention is not limited to such a configuration. It is sufficient that at least one energy storage device 10 be disposed (held) in the blocks BL1, BL2 respectively.

With respect to the first intermediate part 21 and the second intermediate part 22 of the above-mentioned embodiment, one convex part 216 is disposed on the first intermediate part 21, and one recessed portion 226 is disposed on the second intermediate part 22. However, the present invention is not limited to such a configuration. A plurality of convex parts or a plurality of recessed portions may be disposed on the first intermediate part 21 and the second intermediate part 22 respectively. In this case, the plurality of respective convex parts disposed on one of the intermediate parts 21, 22 engage with the corresponding recessed portions disposed on the other of the intermediate parts 22, 21.

Both of a convex part and a recessed portion may be disposed on the first intermediate part 21 and the second intermediate part 22 respectively. For example, to be more specific, a recessed portion and a convex part are disposed on the first intermediate part 21, and a convex part which corresponds to (engages with) the recessed portion of the first intermediate part 21 and a recessed portion which corresponds to (engages with) the convex part of the first intermediate part 21 are disposed on the second intermediate part 22.

In the first intermediate part 21 of the above-mentioned embodiment, the convex part 216 adopts the two stage configuration formed of the first convex part 2160 and the second convex part 2165 which protrudes from the first convex part 2160. However, the convex part 216 is not limited to such a configuration. The convex part 216 may adopts the one stage configuration or three or more stage configuration. Also in this case, it is preferable that the recessed portion 226 of the second intermediate part 22 have a shape where the recessed portions engage with the corresponding respective stages (corresponding convex parts of the respective stages) of the convex part 216 which adopts the one stage configuration or multi-stage configuration.

In the energy storage apparatus 1 of the above-mentioned embodiment, the connecting portion of the connecting member 45 (the portion where the first connecting portion 460 of the first connecting part 46 and the second connecting portion 470 of the second connecting part 47 overlap with each other) is fixed to the intermediate member 2 from an end surface side in the Y axis direction. However, the present invention is not limited to such a configuration. The connecting portion may be fixed to the intermediate member 2 from an end surface side in the Z axis direction. Further, the connecting portion may be fixed to the intermediate member 2 from both sides, that is, from an end surface side in the Y axis direction and an end surface side in the Z axis direction by extending the second portions 460B of the first connecting portion 460 and the fourth portions 470B of the second connecting portion 470 in the Y axis direction, for example. With such a configuration, for example, a strength of the energy storage apparatus 1 against a force applied to the connecting portion of the energy storage apparatus 1 and to an area in the vicinity of the connecting portion of the energy storage apparatus 1 from the Y axis direction or from the Z axis direction can be further enhanced.

In the above-mentioned embodiment, the description has been made with respect to the case where the energy storage device is used as a chargeable and dischargeable nonaqueous electrolyte secondary battery (for example, lithium ion secondary battery). However, the kind and the size (capacity) of the energy storage device can be arbitrarily set. Further, in the above-mentioned embodiment, the description has been made with respect to the lithium ion secondary battery as an example of the energy storage device. However, the energy storage device is not limited to the lithium ion secondary battery. For example, the present invention is also applicable to a primary battery, an energy storage device of a capacitor such as an electric double-stacked capacitor besides various kinds of secondary batteries.

What is claimed is:

1. An energy storage apparatus, comprising:
    a plurality of energy storage devices arranged in a first direction;
    a pair of end members disposed on both ends in the first direction of the energy storage devices;
    a connecting member that extends in the first direction and connects the pair of end members; and
    an intermediate member disposed between adjacent two of the energy storage devices,
    wherein the connecting member includes a first connecting part and a second connecting part, the first connecting part and the second connecting part being decouplable at a position corresponding to the intermediate member in the first direction,
    wherein the intermediate member includes a first intermediate part and a second intermediate part that are separable in the first direction and are engaged with each other,
    wherein the first connecting part includes through holes that respectively overlap with through holes of the second connecting part in a direction that the connecting member faces the energy storage devices,
    wherein, in the direction that the connecting member faces the energy storage devices, first fixing members pass through the respective though holes of the first connecting part and the second connecting part to couple the first connecting part to the second connecting part, and
    wherein the first connecting part further includes another through holes that respectively overlap with another through holes of the second connecting part in the direction that the connecting, member faces the energy storage devices, and
    wherein, in the direction that the connecting member faces the energy storage devices, second fixing members pass through the respective another through holes of the first connecting part and the second connecting to couple the connecting member to the intermediate member.

2. The energy storage apparatus according to claim 1, wherein the first intermediate part is fixed to the first connecting part of the connecting member, the first connecting part being decouplable toward one side in the first direction from a position corresponding to the intermediate member, and
    wherein the second intermediate part is fixed to the second connecting part of the connecting member, the second connecting part being decouplable toward an other side in the first direction from the position corresponding to the intermediate member.

3. The energy storage apparatus according to claim 2, wherein the first and second connecting parts overlap at the position corresponding to the intermediate member, and
    wherein the second fixing members connect the first connecting part and the second connecting part to the intermediate member at a position where the first and second connecting parts overlap.

4. The energy storage apparatus according to claim 2, wherein the first connecting part includes a pair of first lateral frame portions extending in the first direction and a pair of first vertical frame portions extending in a second direction perpendicular to the first direction, wherein the second connecting part includes a pair of second lateral frame portions extending in the first direction and a pair of second vertical frame portions extending in the second direction, wherein one of the pair of the first vertical frame portions and one of the pair of the second vertical fame portions overlap in a third direction perpendicular to the first and second directions, and wherein an other of the pair of the first vertical frame portions and an other of the pair of the second vertical frame portions do not overlap in the third direction.

5. The energy storage apparatus according to claim 1, wherein each of the energy storage devices includes an external terminal protruding in a direction orthogonal to the first direction.

6. The energy storage apparatus according to claim 1, wherein, at the position corresponding to the intermediate member, the first connecting part and the second connecting part couple to each other in a direction that the connecting member faces the energy storage devices.

7. The energy storage apparatus according to claim 1, wherein, in a direction that the connecting member faces the energy storage devices, a portion of the first connecting part overlaps with a portion of the second connecting part.

8. The energy storage apparatus according to claim 1, further comprising an insulator disposed between the connecting member and the energy storage devices in a direction that the connecting member faces the energy storage devices.

9. The energy storage apparatus according to claim 8, wherein the insulator includes:
   a first insulator which covers at least regions of the first connecting part which oppositely face the plurality of energy storage devices; and
   a second insulator which covers at least regions of the second connecting part which oppositely face the plurality of energy storage devices.

10. The energy storage apparatus according to claim 9, wherein, in the first direction, the first insulator is located adjacent to the second insulator.

* * * * *